United States Patent Office.

ALBERT STEFFIN, OF NEW BEDFORD, MASSACHUSETTS, ASSIGNOR TO THE MOUNT WASHINGTON GLASS COMPANY, OF SAME PLACE.

DECORATED GLASS AND METHOD OF DECORATING SAME.

SPECIFICATION forming part of Letters Patent No. 520,125, dated May 22, 1894.

Application filed February 10, 1893. Serial No. 461,818. (No specimens.)

*To all whom it may concern:*

Be it known that I, ALBERT STEFFIN, of New Bedford, in the county of Bristol and State of Massachusetts, have invented certain new and useful Improvements in Decorated Glass and in the Method of Decorating the Same; and I do hereby declare the following specification to be a full, clear, and exact description thereof.

My invention relates to a new method of decorating transparent glass, whereby novel and peculiar effects and results are produced.

The invention consists in forming upon one side or face of the glass article to be decorated an outline of the figure or design to be produced, and forming upon the opposite side or face of such article the complete figure or design, whereby the outline thus formed upon one side will, by reason of the transparency of the glass, combine with the main body of the decoration upon the opposite side and produce a novel and peculiar effect. Thus the outline upon one side, which is preferably formed of comparatively thin, narrow lines, serves to sharpen or accentuate the lines of the main decoration upon the opposite side, and further, owing to the fact that the outline is upon one side of the glass and the main body of the decoration upon the other side, the effect is to give a body or solidity to the decoration as a whole due to the thickness of the glass. The decorations upon the opposite sides of the glass, the outline and the main body of the figure or design, may be produced in any desired manner. Thus the outline upon one side may be a metallic decoration, as by the employment of gold, silver, or other metals or oxides of metal, and the main body of the design be a color decoration produced by the use of paints or pigments. Or the outline may be in colors, and the main body of the decoration in metal, or both may be in colors or both in metals. I have found by experiment that very novel and striking effects are produced by forming the outline in metal, as gold or silver, and the main body of the figure in colors, in which case the metallic decorations are reflected upon the decorations upon the opposite side of the glass. If the decorations upon both sides be of metal, they will reflect upon each other.

A great practical advantage resulting from my new method is that an article of glass provided with both metallic and color decorations may be fired at one firing, and thus much time and trouble be saved. Heretofore when both metallic and color decorations have been employed in the production of a given design, owing to the fact that they have both been applied to the same side of the glass and in contact with each other, it has been impossible to fire the article at a single firing, and for the reason that the metallic decorations would be so absorbed by the colors, or so affected by the fumes arising therefrom in the process of fusing, as to lose their proper color and brightness, and thus be practically spoiled. Consequently it was necessary to subject the article to two firings, or in other words, to first apply the color decorations, then fire the article, then to apply the metallic decorations, and then fire the article a second time. With the present invention, however, by reason of the fact that the color decorations are upon one side of the glass and the metal decorations are upon the opposite side, the metal decorations do not come in contact with the colors, and consequently both may be fired at one firing, and the metal decorations still retain their full luster and brilliancy. Moreover the metal decorations being imposed upon a plain glass surface, will be much brighter and more brilliant than when superposed upon a color-decorated surface as heretofore.

In carrying out my invention either portion of the decoration, either the outline or the main body of the design, may be first applied, but I prefer to first form the outline upon one side, as such outline will then serve as a guide for producing the main body of the design upon the opposite side. This feature is of especial importance in decorating articles of hollow glassware. Owing to the shape of many of such articles of hollow glassware, such as vases for instance, access to the interior is more or less difficult, and with such articles it is very difficult, and in many cases almost impossible, to produce decorations upon the interior with any degree of accuracy, or so as to give any sharp or definite outline to the figure or design which forms the subject of ornamentation. By first forming the outline upon the exterior of the article, such outline will serve as a guide in forming the main body of the design upon its interior. Moreover with the employment of my new method defects or inaccuracies in the interior decoration of an article of the character referred to are practically immaterial, and for the reason that the outline upon the exterior, in addition to serving as a guide for the interior decoration, combines with such interior decoration in such a way as to sharpen or accentuate the lines of the interior decoration and so as to cure any defects that may exist therein.

In all cases the effect of depth or solidity in the decoration produced by my new method and due to the fact that the outline is upon one side of the glass and the main body of the design upon the opposite side, is a novel and striking effect, and one which cannot be produced by applying the entire decoration upon one side only. When the decoration upon one side of the glass is a metallic decoration, the reflection of such decorations upon the decorations upon the opposite side produces still further novel and peculiar effects.

It will be understood that in carrying out my invention it is not necessary that the entire article to be decorated shall be of glass or be transparent, it being only necessary that the portion to be decorated shall be transparent, in order that the decorations upon the opposite sides may unite and combine together to produce the novel effects hereinbefore referred to.

What I claim as my invention, and desire to secure by Letters Patent, is—

1. The method of decorating transparent glass which consists in forming upon one side of the glass an outline of the figure or design to be produced, and forming upon the other side of the glass the main body of said figure or design, substantially as set forth.

2. An article of transparent glass provided with decorations, the outline of the figure or design being formed upon one side of the glass, while the main body of the figure or design is formed upon the opposite side, substantially as described.

ALBERT STEFFIN.

Witnesses:
FREDERICK RATCLIFF,
FRANCIS K. ALLEN.